United States Patent [19]

Seredick

[11] 4,254,666
[45] Mar. 10, 1981

[54] ADJUSTABLE V-BELT

[76] Inventor: William D. Seredick, 581 NW. 40th Ct., Ft. Lauderdale, Fla. 33309

[21] Appl. No.: 5,281

[22] Filed: Jan. 22, 1979

[51] Int. Cl.³ .............................................. F16G 7/06
[52] U.S. Cl. .................................. 474/253; 24/31 C; 24/31 L; 24/38; 24/68 D; 29/267; 254/251; 474/250
[58] Field of Search ............... 74/231 R, 242.7, 231 J, 74/238; 24/31, 38, 68 D; 254/77, 79, 164; 81/9.3; 29/244, 267

[56] References Cited

U.S. PATENT DOCUMENTS

| 338,896 | 3/1886 | Wegmann | 74/231 J |
|---|---|---|---|
| 983,093 | 1/1911 | Svenson | 24/38 X |
| 1,430,623 | 10/1922 | Campbell | 254/77 |
| 2,174,489 | 9/1939 | Groves | 29/267 |
| 3,011,775 | 12/1961 | MacLeod | 74/238 |
| 3,157,056 | 11/1964 | Gray et al. | 74/238 |
| 3,748,699 | 7/1973 | Cunningham | 24/38 |
| 3,777,586 | 12/1973 | Stirton | 74/231 J |
| 3,788,156 | 1/1974 | Jackson | 74/231 J X |
| 4,031,766 | 6/1977 | Beck | 74/231 J |

FOREIGN PATENT DOCUMENTS 29066 12/1921 Denmark .................................. 254/79

Primary Examiner—C. J. Husar
Assistant Examiner—Conrad Berman
Attorney, Agent, or Firm—Malin & Haley

[57] ABSTRACT

A V-belt for coupling at least two pulleys together, the pulleys having a substantially V-shaped groove, the belt being manually installable without moving or adjusting the distance between the pulleys. The particular usage of the present invention is for temporary (emergency) or permanent installation of a "fan" belt found on (but not limited to) conventional vehicles of the V-belt type. The device allows anyone, upon the destruction of a fan belt, to readily and quickly install a temporary pulley belt manually, without tools. For a permanent installation, a small implement may be used with the present device for increased tensioning of the belt in its proper position. The improved belt includes first and second free ends (male and female respectively that are firmly connected together by longitudinally interlocking a plurality of laterally disposed, inclined teeth located near the male end with lateral rows of inclined grooves located in an interlock passage in the female end. During installation, once the belt is positioned around the pulleys, the male end is inserted into the interlock passage. The male end is tapered for a short length in thickness for easy insertion (expanding away from the end point) to let a length of excess belt through the female end where the tightening device may be used. Beyond the tapered segment, the belt (male end) remains the same thickness to the female end. The interlocking force increases as a function of the length of the male end received through the interlock passage because of the increasing thickness of the male end.

2 Claims, 7 Drawing Figures

ADJUSTABLE V-BELT

BACKGROUND OF THE INVENTION

This invention relates generally to an improved V-belt for joining together a pair of rotatable pulleys, and, as shown in one example, to a fan belt for a conventional vehicle engine that couples the fan pulley (and possibly other engine accessory pulleys together) with the crank shaft pulley.

One of the problems experienced heretofore with a conventional combustion engine is that oftentimes the "fan belt" may become destroyed while the vehicle is in operation, many miles from a service station or mechanic shop. On most conventional vehicle engines, it is impossible to drive the vehicle for any distance without a fan belt because the engine could easily overheat, causing great damage to the motor. In such a case, the vehicle must either be towed in or a new fan belt installed at the particular location of the vehicle. In order to install a new fan belt, in many vehicles one of the pulleys to be joined must be physically moved closer to the other pulley enough so that the belt will fit over the groove in each pulley. Many people, due to lack of mechanical know-how or proper tools, are not capable of installing a new fan belt. This usually requires a wrench or tool to loosen at least one pulley mount and another tool apply tension on the belt while tightening the pulley mount back to a desired position.

Another problem encountered when a fan belt fails in a remote area is to find a service station that stocks a fan belt of the correct size.

The present invention overcomes the problems of the prior art by providing a pulley belt that is useful on any type of conventional vehicle that employs a V-belt system which can be readily installed without elaborate tools, which does not require that the pulleys be moved relative to each other or adjusted in any way, and which can accommodate any type of vehicle engine pulleys regardless of pulley diameter, separation distance, or location. Another benefit of the present invention is that moveable brackets heretofore used for mounting accessories having pulleys can be replaced with integrally formed rigid brackets which attach to the engine.

BRIEF DESCRIPTION OF THE INVENTION

A flexible belt for driveably connecting at least two pulleys, said belt having a first free end and a second free end, said flexible belt including a trapezoidally-shaped cross-section (perpendicular to the longitudinal axis of the belt), said belt having a passage including a plurality of grooves disposed at said second free end, said first free end being tapered and including a plurality of inclined teeth which are interlockable with said grooves in said passage. The belt is installable about a pair of pulleys by pulling the first free end through the passage in the second free end which interlocks the first and second free ends under tension, either by hand or with a small tensioning implement described below.

A small hand-held implement that independently grips both the first and second free ends of the belt may be used as a lever for increasing the tension on the belt to pull the belt ends together longitudinally until the teeth interlock at the desired tension.

It is an object of this invention to provide an improved, universally adjustable fan belt for conventional vehicle engine pulleys.

It is another object of this invention to provide an adjustable, universally sized "V-belt" for pulley drive systems that can be readily installed by hand without adjustably repositioning the pulleys to be joined together.

And yet, still another object of this invention is to provide for an improved belt for joining together at least two or more pulleys which can be quickly and efficiently installed and which is sized to fit but not limited to any conventional vehicle.

In accordance with these and other objects which will be apparent hereinafter, the instant invention will now be described with particular reference to the accompanying drawings.

PREFERRED EMBODIMENT OF THE INVENTION

Figure 1:
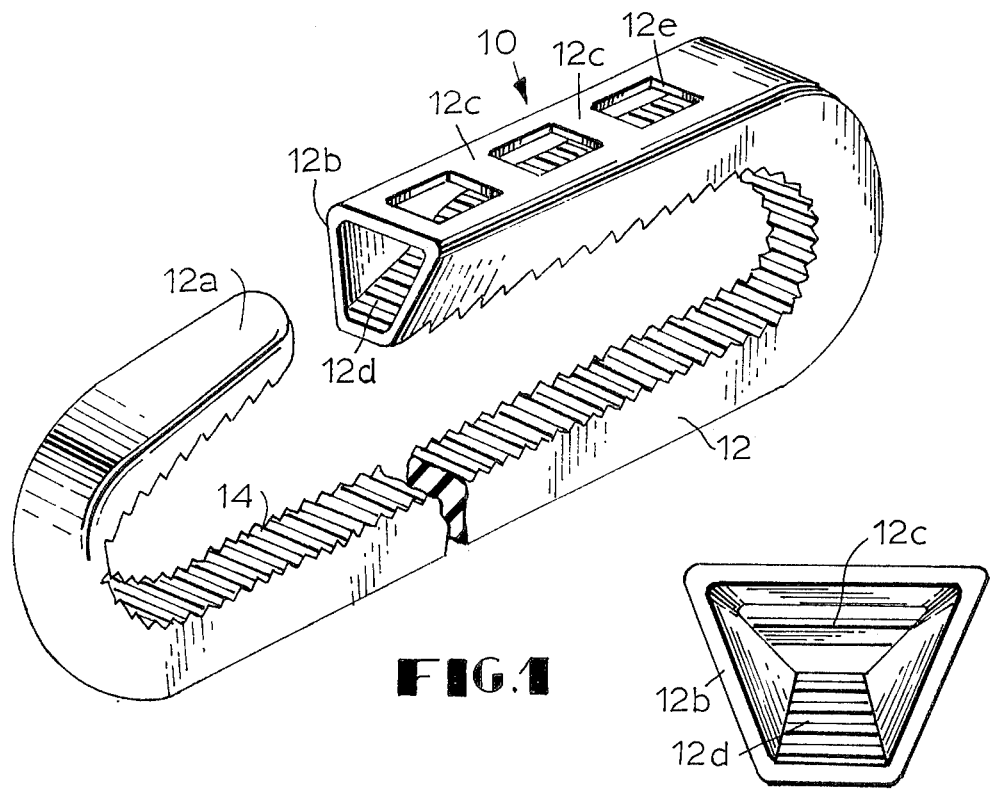
FIG. 1 shows a perspective view partially cut away of one embodiment of the present invention.

Referring now to the drawings and specifically FIG. 1, the instant invention is shown generally at 10 comprised of a flexible pulley belt 12 which may be made of nylon or an artificial rubber or other comparable material having a plurality of laterally disposed teeth located along the inner peripheral surface (when the belt is formed in a loop). One free end of belt 12 includes a tapered male portion 12a which is received through opening 12b (female end) into the interlocking passage which is formed as part of the outer peripheral surface, a pair of tensioning bands 12c forming the top of the passage. The bottom floor 12d of the interlock passage includes lateral grooves disposed along the longitudinal floor of the passage which are sized and shaped to interlock with teeth 14 to resist longitudinal movement that would tend to separate the free end 12a from the passage end face 12b. The teeth 14 and the grooves 12d may be inclined to resist such movement.

Figure 3:
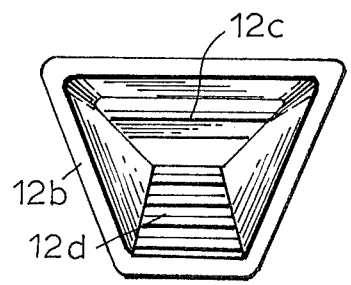
FIG. 3 shows a front elevational view of the interlocking passage (female end) of the present invention.
Figure 2:
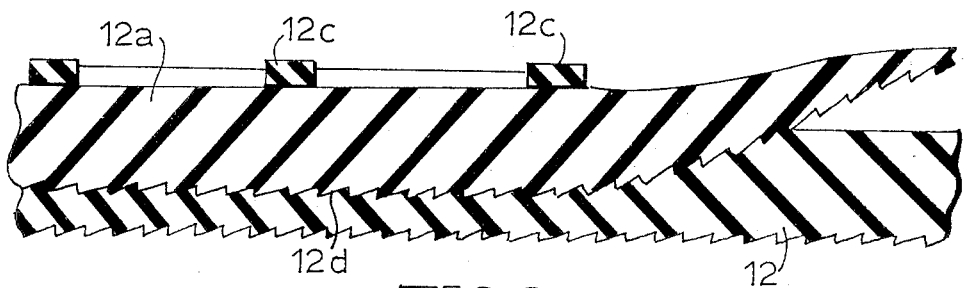
FIG. 2 shows a side elevational, fragmentary view in cross-section of the interlocking ends of the present invention.

As shown in FIGS. 2 and 3, the vertical thickness of the male end 12a and the passage floor 12d may be tapered (either or both) to allow for ease of initial insertion of the male end through the passage where it exits through aperture 12e in the upper surface of the passage. As either or both surfaces get larger, the farther through the male end is pulled, tension for interlocking the two togther increases because of tensioning straps 12c along the upper end of the passage.

Figure 4:
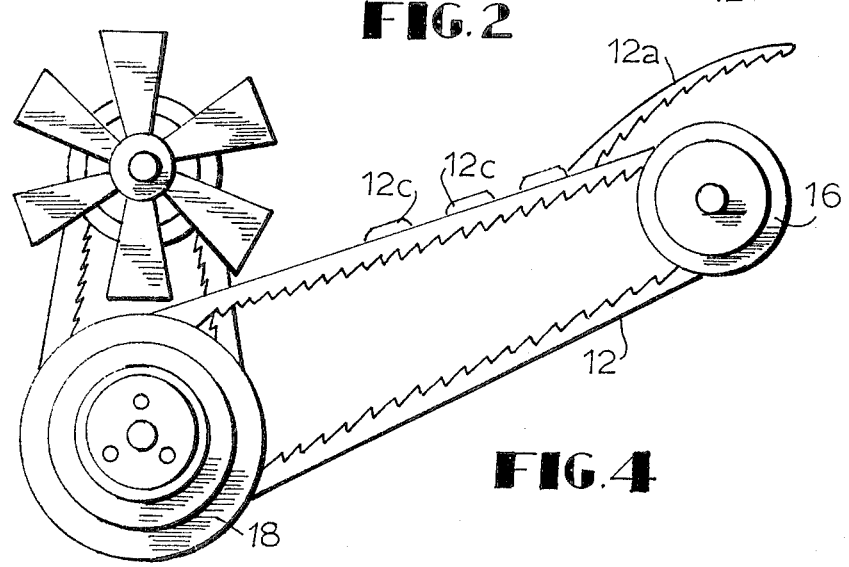
FIG. 4 shows a side elevational view of the present invention installed in a conventional vehicle, prior to removal of the tapered end.

Referring now to FIG. 4, a typical installation of the present invention is shown with the belt 12 disposed around a pair of pulleys 16 and 18 and the belt 12 tensioned after the male end 12a has been pulled through the passage as described above. After the tensioning operation is completed, the male end portion 12a may be cut off at an appropriate location to eliminate unnecessary flapping of the free end.

Figure 5:
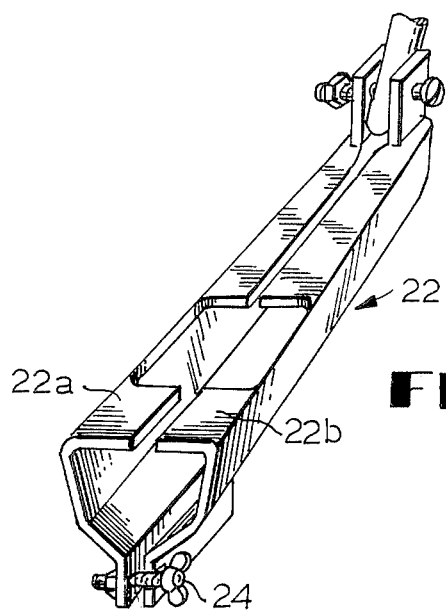
FIG. 5 is a perspective view of a portion of the tool used with the instant invention, the portion shown for gripping an interlock passage (female end) of the belt during installation.
Figure 6:
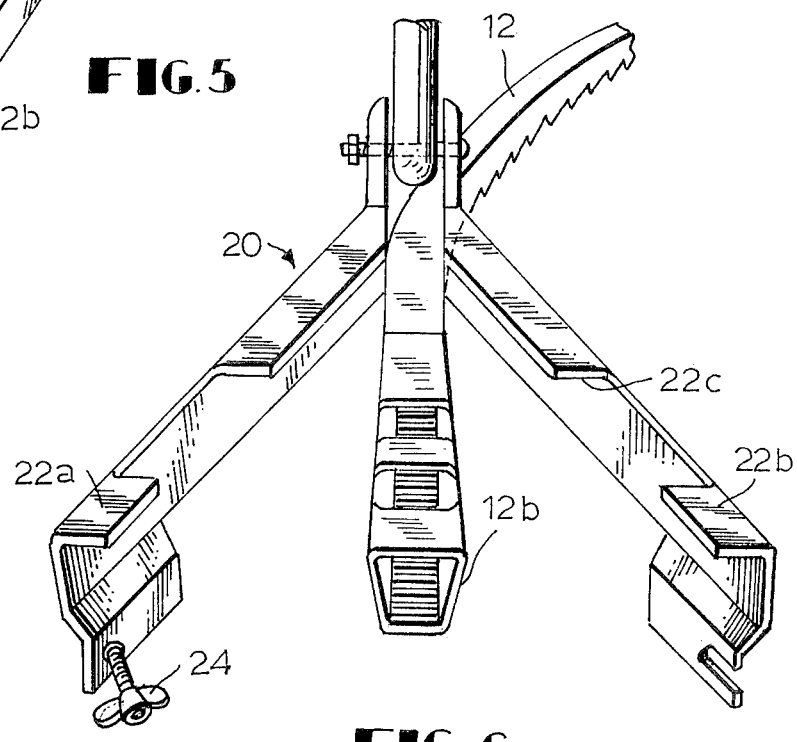
FIG. 6 is a front view of the tool useful for tensioning the belt with this invention.
Figure 7:
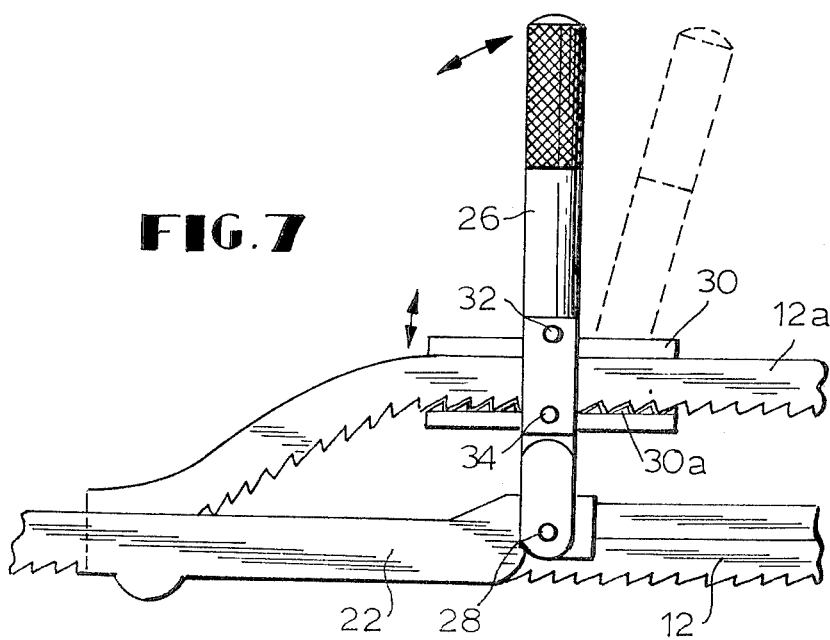
FIG. 7 is a side elevational view shown with the belt ends engaged of the tensioning tool.

Referring now to FIGS. 5 through 7, a small hand-held tool useful for tensioning the present invention for a more permanent installation is shown. FIG. 5 shows a bifurcated rigid clamp having an interior chamber shaped to receive the outside thickness of the belt longitudinally including clamp arms 22a and 22b which may be tightened together around the belt by a fastener 24. FIG. 6 shows the clamp arms 22a and 22b spread apart with a belt 12 received longitudinally therebetween including the belt free end 12b. The bifurcated clamp 22 includes an upper opening 22c which allows the male end, which is received in the passage in the female end of the belt, to pass through an outside belt. FIG. 7 shows a clamp 30 that receives the male end 12a attached to handle 26 which pivots at pin 28 (relative to the bifurcated clamp 22) such that the male end may be pulled by lever action of handle 26, longitudinally, relative to the female end held by and within clamp 22 for increased tensioning of the device or belt when in place. The handle 26 pivots about pin 28 to provide leverage for tensioning. To use the tool, the bifurcated arms are spread apart and placed around the interlock passage in the female end of the belt and the fastener locked tightly together, locking the clamp arms together. This insures no relative movement between the belt passage end and the tool. The male end is then inserted into clamp 30 (FIG. 7) and threaded therethrough and the handle 26 pulled in the direction to tension the belt until the satisfactory tension is achieved.

For a permanent mounting, adhesive or solvent forming an ionic bond may be used on the interlocking teeth or inner surfaces forming a permanent interlock. Note that the teeth are angled to resist separation of the belt once they are interlocked.

It should be noted in FIG. 7 that clamp 30 includes inclined teeth 30a that pull on belt end 12a in one direction for tensioning. The clamp 30 is pivotal about pins 32 and 34 relative to handle 26 for longitudinal alignment during tensioning.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A flexible belt for connecting together at least two pulleys, comprising:

a flexible elongated body of unitary construction, the body having a cross-section shape in the form of a trapezoid, the body having a female end and a male end, said male end being interlockable into said female end, the female end having an opening and a chamber, said female end chamber having a cross-sectional shape in the form of a trapezoid, said shorter parallel wall of said chamber having a plurality of teeth laterally disposed thereon, said longer parallel wall of said female chamber having a plurality of apertures disposed therethrough sized to selectively receive the male free end of said belt, said male end of said belt member having a trapezoidal cross-sectional shape, said male end being tapered in height diminishing to a smaller thickness, said male end having a plurality of inclined interlockable teeth disposed along the shorter parallel side whereby said male end may be inserted into the female end opening and chamber and adjusted in length until it is interlocked with the inclined teeth of the female end and exists through one of said apertures.

2. In combination with the belt of claim 1, a tool for tensioning the belt ends together, comprising:

a pair of lockable but spreadable clamping arms connectable to the female end of said belt;

a handle pivotally connected at one end to said clamping arms; and a second clamp pivotally connected to said handle for attaching the male end of said belt to said handle.

* * * * *